("(12) United States Patent  
Atalla et al.

(10) Patent No.: US 10,147,244 B2  
(45) Date of Patent: Dec. 4, 2018

(54) FAULT SOURCE PARAMETER IDENTIFICATION

(71) Applicant: Simmonds Precision Products, Inc., Vergennes, VT (US)

(72) Inventors: Mauro J. Atalla, Wake Forest, NC (US); Thomas G. Wiegele, Eagan, MN (US); Kaare Josef Anderson, Farmington, MN (US); Michael A. Lynch, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 63 days.

(21) Appl. No.: 15/179,160

(22) Filed: Jun. 10, 2016

(65) Prior Publication Data

US 2017/0358152 A1    Dec. 14, 2017

(51) Int. Cl.
| | | |
|---|---|---|
| *G07C 5/08* | (2006.01) | |
| *B64C 13/50* | (2006.01) | |
| *G01P 5/16* | (2006.01) | |
| *G01P 13/02* | (2006.01) | |
| *G01P 21/02* | (2006.01) | |

(52) U.S. Cl.
CPC .......... *G07C 5/0808* (2013.01); *B64C 13/503* (2013.01); *G01P 5/16* (2013.01); *G01P 13/025* (2013.01); *G01P 21/025* (2013.01)

(58) Field of Classification Search
CPC .................................................. G07C 5/0808
USPC .......................................................... 701/34
See application file for complete search history.

(56) References Cited

U.S. PATENT DOCUMENTS

| | | |
|---|---|---|
| 5,919,267 A | 7/1999 | Urnes et al. |
| 6,502,042 B1 | 12/2002 | Eid et al. |
| 7,257,470 B2 | 8/2007 | Hongerholt et al. |
| 7,660,774 B2 | 2/2010 | Mukherjee et al. |
| 7,734,400 B2 | 6/2010 | Gayme et al. |
| 8,209,083 B2 | 6/2012 | Ganguli et al. |
| 8,352,216 B2 | 1/2013 | Subbu et al. |
| 8,521,341 B2 | 8/2013 | Brotherton |
| 8,572,009 B2 | 10/2013 | Harris |
| 8,942,882 B2 | 1/2015 | Swearingen et al. |

(Continued)

FOREIGN PATENT DOCUMENTS

EP    1293784 A2    3/2003

OTHER PUBLICATIONS

Extended European Search Report for European Patent Application No. 17175478.1, dated Aug. 17, 2017, 10 pages.

(Continued)

*Primary Examiner* — Yazan A Soofi
(74) *Attorney, Agent, or Firm* — Kinney & Lange, P.A.

(57) ABSTRACT

A first air data value is generated based on a first set of parameters. A second set of parameters that does not include any of the first set of parameters is processed through an artificial intelligence network to generate a second air data value. The second set of parameters is processed through a plurality of diagnostic artificial intelligence networks to generate a plurality of diagnostic air data values. Each of the plurality of diagnostic artificial intelligence networks excludes a different one of the second set of parameters. One of the second set of parameters is identified, based on the first air data value and the plurality of diagnostic air data values, as a fault source parameter that is associated with a fault condition.

20 Claims, 4 Drawing Sheets

(56) References Cited

U.S. PATENT DOCUMENTS

| | | |
|---|---|---|
| 2006/0212181 A1 | 9/2006 | Cronin et al. |
| 2007/0130096 A1 | 6/2007 | Selvig et al. |
| 2010/0100260 A1 | 4/2010 | McIntyre et al. |
| 2015/0100184 A1* | 4/2015 | Nathan .................. G01C 23/00 701/7 |
| 2016/0004255 A1* | 1/2016 | Moxon ................ G05D 1/0055 701/7 |
| 2016/0075444 A1 | 3/2016 | Girod et al. |
| 2017/0158347 A1* | 6/2017 | Anderson .............. B64D 43/02 |

OTHER PUBLICATIONS

Napolitano et al., "Neural-Network-Based Scheme for Sensor Failure Detection, Identification, and Accommodation", Journal of Guidanc d and Control and Dynamics, AIAA, REston, VA, US, vol. 18, No. 6, Nov. 1, 1995, pp. 1280-1286.

* cited by examiner

FAULT SOURCE PARAMETER IDENTIFICATION

BACKGROUND

The present disclosure relates generally to air data systems, and more particularly to air data systems that can utilize artificial intelligence to generate air data outputs for an aircraft.

Modern aircraft often incorporate air data systems that calculate air data outputs based on measured parameters collected from various sensors positioned about the aircraft. For instance, many modern aircraft utilize pneumatic air data probes that measure pitot pressure, static pressure, or other parameters of airflow across the probe. Such pneumatic air data probes often include one or more air data sensing ports, such as static pressure ports and/or total pressure (i.e., stagnation pressure) ports. A portion of air flowing over the probes is diverted to the ports that are pneumatically connected to pressure sensors that sense the atmospheric pressure outside the aircraft. Such measured pressures are usable for determining air data outputs, such as aircraft pressure altitude, altitude rate (e.g., vertical speed), airspeed, Mach number, angle of attack, angle of sideslip, or other air data outputs.

To increase system reliability, aircraft manufacturers typically incorporate redundant (e.g., backup) systems that can provide outputs to consuming systems in the event that a primary system fails or is otherwise determined to be unreliable. For instance, many aircraft incorporate multiple (e.g., two, three, four, or more) pneumatic air data probes, certain of which are designated as backup systems for use when a primary system is deemed unreliable. In some cases, backup systems that utilize dissimilar design architectures and components as compared with a primary system can be desirable to reduce the chances of common mode failures between the primary and backup systems.

SUMMARY

In one example, a method includes sensing a first set of parameters, and receiving a second set of parameters that does not include any of the first set of parameters. The method further includes generating a first air data value based on the first set of parameters, and processing the second set of parameters through an artificial intelligence network to generate a second air data value. The method further includes processing the second set of parameters through a plurality of diagnostic artificial intelligence networks to generate a plurality of diagnostic air data values. Each of the plurality of diagnostic artificial intelligence networks excludes a different one of the second set of parameters. The method further includes identifying, based on the first air data value and the plurality of diagnostic air data values, one of the second set of parameters as a fault source parameter that is associated with a fault condition.

In another example, a system includes one or more processors and computer-readable memory. The computer-readable memory is encoded with instructions that, when executed by the one or more processors, cause the system to generate a first air data value based on a first set of parameters, and process a second set of parameters that does not include any of the first set of parameters through an artificial intelligence network to generate a second air data value. The computer-readable memory is further encoded with instructions that, when executed by the one or more processors, cause the system to process the second set of parameters through a plurality of diagnostic artificial intelligence networks to generate a plurality of diagnostic air data values, each of the plurality of diagnostic artificial intelligence networks excluding a different one of the second set of parameters. The computer-readable memory is further encoded with instructions that, when executed by the one or more processors, cause the system to identify, based on the first air data value and the plurality of diagnostic air data values, one of the second set of parameters as a fault source parameter that is associated with a fault condition.

DETAILED DESCRIPTION

As described herein, a system implementing techniques of this disclosure can compare air data values generated using mutually exclusive sets of input parameters to identify one or more of the input parameters as a fault source parameter associated with a fault condition. For example, the system can generate a first air data value based on a first set of parameters. The first set of parameters can include, e.g., measured pressure values (e.g., pitot pressure, static pressure, or other measured pressure values), optically-measured values, or other measured values that are usable to determine air data values, such as airspeed, altitude, angle of attack, angle of sideslip, or other air data values. The system can further generate a second air data value based on a second set of parameters that does not include any of the first set of parameters (i.e., mutually exclusive of the first set of parameters). For instance, the system can process the second set of parameters through an artificial intelligence network that is trained to generate the air data output value. The second set of parameters can include, among others, aircraft thrust parameters, aircraft engine throttle settings, flight control surface positions and/or surface loading parameters, aircraft remaining fuel weight and/or usage rates, aircraft weight, landing gear position (e.g., deployed or stowed), aircraft mass balance, and aircraft acceleration and/or angular rates (e.g., received from an inertial reference system). In some examples, the second set of parameters can include an air data parameter (e.g., the first air data value) generated using the first set of parameters.

A deviation between the first and second air data values can be indicative of a fault condition associated with one or more of the input parameters. Accordingly, in response to identifying a deviation between the first and second air data values, the system can generate a set of diagnostic air data values by processing the second set of parameters through a plurality of diagnostic artificial intelligence networks, each excluding a different one of the second set of parameters and trained to generate the air data value. The system can therefore identify, based on agreement between the diagnostic air data values and the first air data value (i.e., generated based on the first set of input parameters that is mutually exclusive of the second set of input parameters), one or more of the second set of input parameters as a fault source parameter that is associated with a fault condition. For instance, in the event that the first air data value that is generated using the first set of input parameters (e.g., measured pressure parameters) deviates from the second air data value that is generated using the second set of input parameters by at least a threshold amount, the system can generate the plurality of diagnostic values using the plurality of artificial intelligence networks that each exclude a different one of the second set of input parameters. If, for example, the diagnostic air data value that is generated using a diagnostic artificial intelligence network that excludes, e.g., a left aileron position input parameter, agrees with the first air data parameter (e.g., is within a threshold deviation from the first air data value), the system can identify the left aileron position input parameter as a fault source parameter associated with a fault condition of, e.g., the left aileron position sensor. Accordingly, a system implementing techniques of this disclosure can enhance aircraft fault diagnostic operations, thereby helping to increase overall aircraft system reliability.

Figure 1:
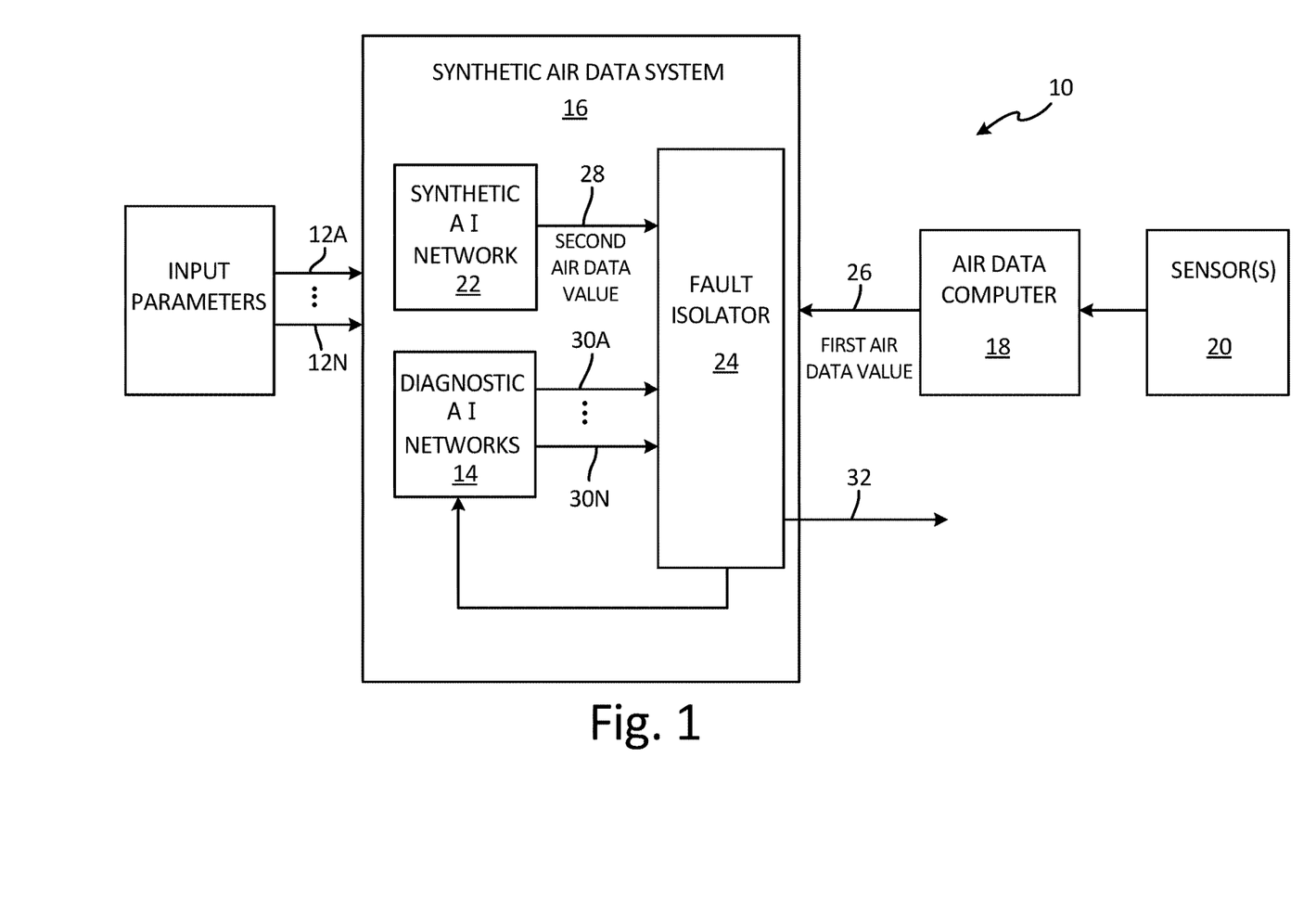
FIG. 1 is a schematic block diagram of an example system that processes a set of input parameters through a plurality of diagnostic artificial intelligence networks to identify a fault source parameter associated with a fault condition.

FIG. 1 is a schematic block diagram of system 10 that processes a set of input parameters 12A-12N through a plurality of diagnostic artificial intelligence networks 14 to identify a fault source parameter associated with a fault condition. As illustrated in FIG. 1, system 10 includes synthetic air data system 16, air data computer 18, and one or more sensors 20. Synthetic air data system 16 includes diagnostic artificial intelligence networks 14, synthetic artificial intelligence networks 22, and fault isolator 24.

Synthetic air data system 16 receives first air data value 26 from air data computer 18 that generates first air data value 26 based on measured values received from sensor(s) 20. Synthetic air data system 16 processes input parameters 12A-12N through synthetic artificial intelligence network 22 to generate second air data value 28. Fault isolator 24 compares first air data value 26 with second air data value 28 and, in certain examples, initiates processing of input parameters 12A-12N through diagnostic artificial intelligence networks 14 in response to an identified deviation between first air data value 26 and second air data value 28 to generate diagnostic air data values 30A-30N. As is further described below, each of diagnostic artificial intelligence networks 14 excludes a different one of input parameters 12A-12N. Fault isolator 24 compares diagnostic air data values 30A-30N to first air data value 26. Fault isolator 24 determines whether one or more of diagnostic air data values 30A-30N agrees with (e.g., is within a threshold deviation from) first air data value 26. In response to determining that one of diagnostic air data values 30A-30N agrees with first air data value 26, fault isolator 24 identifies the one of input parameters 12A-12N that was excluded from the corresponding one of diagnostic artificial intelligence networks 14 during generation of the identified one of diagnostic air data values 30A-30N that agrees with first air data value 26. Fault isolator 24 identifies the excluded one of input parameters 12A-12N as a fault source parameter that is associated with a fault condition. In response, fault isolator 24 can output fault indication 32 including an identification of the fault parameter and/or data corresponding to the identified fault parameter.

While the example of FIG. 1 is illustrated and described with respect to a single first air data value 26 and a single second air data value 28, aspects of this disclosure are not so limited. For instance, air data computer 18 can generate multiple air data values, each corresponding to a different air data value generated by a different synthetic artificial intelligence network 22 and different diagnostic air data values generated by differing diagnostic artificial intelligence networks 14. As such, techniques of this disclosure are applicable to multiple air data values (e.g., altitude, airspeed, angle of attack, angle of sideslip, or other air data values) that are generated based on multiple sets of input parameters 12A-12N and processed through a plurality of diagnostic artificial intelligence networks to identify one or more of input parameters 12A-12N as a fault source parameter that is associated with a fault condition.

Synthetic air data system 16 can include one or more processors and computer-readable memory encoded with instructions that, when executed by the one or more processors, cause synthetic air data system 16 to operate in accordance with techniques described herein. Synthetic air data system 16, in some examples, can include one or more stand-alone electronic devices, such that synthetic air data system 16 is separate from air data computer 18. In other examples, synthetic air data system 16 can be included in any one or more of air data computer 18 and/or other aircraft systems, such that functionality attributed herein to synthetic air data system 16 is performed by and/or distributed among one or more electronic devices of such other systems. For instance, in some examples, air data computer 18 (or one or more air data computers substantially similar to air data computer 18) can implement functionality attributed herein to synthetic air data system 16. In other examples, any one or more portions of synthetic air data system 16 can be implemented in a different aircraft system, such as a prognostic health management (PHM) system that is configured to diagnose fault conditions and/or predict a remaining useful life of various aircraft system components. In general, synthetic air data system 16 includes one or more processors and computer-readable memory encoded with instructions that, when executed by the one or more processors, cause synthetic air data system 16 to process input parameters 12A-12N through a plurality of diagnostic artificial intelligence networks to generate diagnostic air data values 30A-30N that are usable to identify one or more of input parameters 12A-12N as a fault source parameter that is associated with a fault condition.

Air data computer 18 includes electrical components, such as one or more processors, computer-readable memory, or other electrical components configured to generate air data outputs (e.g., first air data value 26) corresponding to one or more operational states of an the associated aircraft. Non-limiting examples of such air data outputs include calibrated airspeed, true airspeed, Mach number, altitude (e.g., pressure altitude), angle of attack (i.e., an angle between oncoming airflow or relative wind and a reference line of a wing of the aircraft), vertical speed (e.g., altitude rate), and angle of sideslip (i.e., an angle between a direction of travel and a direction extending through a nose of the aircraft). While illustrated as including a single air data computer 18, in other examples, system 10 can include two or more air data computers 18. Similarly, while synthetic air data system 16 and air data computer 18 are illustrated in the example of FIG. 1 as separate components, in other examples, synthetic air data system 16 and air data computer 18 can be implemented as a same component or integrated system.

Processor(s) of synthetic air data system 16 and air data computer 18 can include any one or more of a microprocessor, a controller (e.g., microcontroller), a digital signal processor (DSP), an application specific integrated circuit (ASIC), a field-programmable gate array (FPGA), or other equivalent discrete or integrated logic circuitry. Processor(s) of synthetic air data system 16 and/or air data computer 18 can, in some examples, include and/or implement a clocking function that can be used for time synchronization of sensed parameters utilized to generate first air data value 26 and second air data value 28, as is further described below. Computer-readable memory of synthetic air data system 16 and air data computer 18 can be configured to store information within synthetic air data system 16 and air data computer 18 during operation. Such computer-readable memory, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the computer-readable memory is a temporary memory, meaning that a primary purpose of the computer-readable memory is not long-term storage. Computer-readable memory, in some examples, includes and/or is described as volatile memory, meaning that the computer-readable memory does not maintain stored contents when power to synthetic air data system 16 or air data computer 18 is removed. Examples of volatile memories can include random access memories (RAM), dynamic random access memories (DRAM), static random access memories (SRAM), and other forms of volatile memories. In some examples, computer-readable memory is used to store program instructions for execution by one or more processors of synthetic air data system 16 and air data computer 18. Computer-readable memory, in one example, is used by software or applications executing on synthetic air data system 16 and air data computer 18 to temporarily store information during program execution.

Computer-readable memory of synthetic air data system 16 and air data computer 18, in some examples, also includes one or more computer-readable storage media. Computer-readable storage media can be configured to store larger amounts of information than volatile memory. Computer-readable storage media can be configured for long-term storage of information. In some examples, computer-readable storage media include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Sensor(s) 20 can include any one or more sensing devices capable of sensing aircraft environmental and/or operating conditions that are usable for generating first air data value 26. For instance, sensor(s) 20 can include one or more pressure sensors (e.g., transducers) configured for use in measuring static pressure and/or pitot pressure (e.g., total pressure) of airflow across a pitot-static probe or other air data sensing probe connected to an exterior of the aircraft. In some examples, sensor(s) 20 can include optical or other sensors capable of measuring aircraft environmental and/or operating conditions related to air data values (e.g., first air data value 26). In certain examples, sensor(s) 20 can include an aircraft angle of attack vane or other such sensor configured to rotate and align with a direction of airflow about the exterior of the aircraft to sense an angle of attack of the aircraft.

Input parameters 12A-12N can include measured and/or calculated parameters indicative of an operational state of aircraft systems and/or components. Examples of input parameters 12A-12N include, but are not limited to, inputs corresponding to aircraft control surface position (e.g., ailerons, elevator, rudder, spoilerons, flaps, slats, or other control surfaces) and/or control surface loading, aircraft mass and/or mass balance (e.g., current and/or at a predefined time, such as at takeoff), remaining fuel weight, engine thrust parameters (e.g., engine N1, N2, EGT, throttle settings, or other thrust parameters), aircraft navigational information (e.g., aircraft position, heading, altitude, ground speed, airspeed, or other navigational information), air temperature information (e.g., static air temperature, total air temperature, outside air temperature, or other temperature information), aircraft acceleration and/or angular rate information (e.g., received from an IRS), landing gear position information (e.g., deployed, stowed, in transit, or other landing gear position information), or other aircraft system and/or component operational input parameters. In some examples, input parameters 12A-12N can include one or more air data parameters generated using input parameters received from sensor(s) 20, such as first air data value 26 or other air data values. The set of input parameters 12A-12N can be mutually exclusive of those input parameters received from sensor(s) 20 and used to generate first air data value 26. That is, input parameters 12A-12N, in certain examples, can include a set of input parameters usable by synthetic air data system 16 to generate second air data value 28 via synthetic artificial intelligence network 22 that does not include any of the input parameters received by air data computer 18 from sensor(s) 20 to generate first air data value 26.

Air data computer 18, as illustrated in FIG. 1, is operatively connected (e.g., electrically and/or communicatively connected) to sensor(s) 20 to receive a first set of sensed parameters from sensor(s) 20 for generation of first air data value 26. Air data computer 18 is communicatively coupled to synthetic air data system 16 to transmit first air data value 26 to synthetic air data system 16. In examples where air data computer 18 implements one or more aspects of synthetic air data system 16, synthetic air data system 16 may receive first air data value 26 via inter-process communications, such as via an inter-process communication data structure or other internal communications operations. In some examples, air data computer 18 can transmit a time value (e.g., an absolute time such as GMT time, a relative time since power-up, or other time value) with first air data value 26 corresponding to a time at which the first set of parameters from sensor(s) 20 was received (or sensed) and utilized to generate first air data value 26. In other examples, synthetic air data system 16 can identify a time (absolute or relative) at which first air data value 26 is received. Synthetic air data system 16 can utilize the time value for data synchronization and comparison with second air data value 28, as is further described below.

As further illustrated in FIG. 1, synthetic air data system 16 is configured to receive input parameters 12A-12N and output fault indication 32 via, e.g., an aircraft communications data bus or other communications network. For instance, synthetic air data system 16 can be configured to send and receive data on one or more aircraft communications data buses via, e.g., a defined communication protocol, such as the Aeronautical Radio, Incorporated (ARINC) 429 communication protocol or other defined protocol. Synthetic air data system 16 can receive input parameters 12A-12N via the communications data bus directly from transmitting aircraft systems (e.g., engine control systems, flight management computers, flight control computers) and/or from a data concentrator unit (DCU) or other aircraft communications management system. In some examples, any one or more of input parameters 12A-12N can include a time value, such as an absolute time (e.g., GMT time), a relative time since power-up, or other time value at which the respective one of input parameters 12A-12N was sensed. In certain examples, synthetic air data system 16 can associate input parameters 12A-12N with a time value (e.g., absolute time value, relative time value, or other time value) at which synthetic air data system 16 receives input parameters 12A-12N. Synthetic air data system 16 can utilize the time values to time-synchronize first air data value 26 and the set of input parameters 12A-12N that are utilized to generate second air data value 28, as is further described below. Synthetic air data system 16 can output fault indication 32 via the aircraft data bus and/or directly to a consuming system, such as the DCU, a display device, a PHM controller, or other consuming system.

As illustrated in FIG. 1, synthetic air data system 16 includes synthetic artificial intelligence network 22, diagnostic artificial intelligence networks 14, and fault isolator 24. As is further described below, synthetic air data system 16 processes input parameters 12A-12N through synthetic artificial intelligence network 22 to generate second air data value 28. In addition, synthetic air data system 16 processes input parameters 12A-12N through diagnostic artificial intelligence networks 14 to generate diagnostic air data values 30A-30N. Examples of synthetic artificial intelligence network 22 and diagnostic artificial intelligence networks 14 include artificial neural networks, probabilistic graphical models such as Bayesian networks, probabilistic classifiers and/or controllers (e.g., Gaussian mixture models), or other forms of artificial intelligence networks. As one example, synthetic artificial intelligence network 22 and each of diagnostic artificial intelligence networks 14 can be separate artificial neural networks, each having at least one internal layer of nodes (often referred to as a hidden layer of neurons) that apply one or more weights, biases, and/or transfer functions to input parameters 12A-12N to correlate input parameters 12A-12N to a common air data value (e.g., altitude, airspeed, Mach number, angle of attack, angle of sideslip, or other air data value).

In some examples, such as when synthetic artificial intelligence network 22 and diagnostic artificial intelligence networks 14 are artificial neural networks, the weights, biases, and transfer functions of the hidden layers of neurons can be pre-defined (e.g., pre-trained via offline pre-training) and fixed, such that synthetic air data system 16 does not modify the weights, biases, and transfer functions during operation. In other examples, synthetic air data system 16 can incorporate an active training (or "learning") mode in which synthetic air data system 16 modifies the weights, biases, and transfer functions applied by the neurons of each network based on feedback of the generated air data value and a reference air data value.

In operation, air data computer 18 receives a first set of input parameters from sensor(s) 20 and generates first air data value 26 based on the first set of input parameters. Air data computer 18 communicates first air data value 26 to synthetic air data system 16. Synthetic air data system 16 receives input parameters 12A-12N (i.e., a second set of input parameters) and processes the set of input parameters 12A-12N through synthetic artificial intelligence network 22 to generate second air data value 28. Input parameters 12A-12N, in certain examples, can be mutually exclusive of the first set of input parameters received from sensor(s) 20, meaning that input parameters 12A-12N do not include any of the input parameters received from sensor(s) 20.

In some examples, fault isolator 24 compares first air data value 26 and second air data value 28 and initiates processing of input parameters 12A-12N through diagnostic artificial intelligence networks 14 in response to identifying a deviation between first air data value 26 and second air data value 28 that exceeds a threshold deviation. In other examples, fault isolator 24 may not initiate the processing of input parameters 12A-12N through diagnostic artificial intelligence networks 14 as responsive to identifying the deviation between first air data value 26 and second air data value 28. Rather, synthetic air data system 16 may continually process input parameters 12A-12N through diagnostic artificial intelligence networks 14 to generate diagnostic air data values 30A-30N that are provided to fault isolator 24. In examples where fault isolator 24 initiates the processing of input parameters 12A-12N through diagnostic artificial intelligence networks 14 in response to identifying the threshold deviation between first air data value 26 and second air data value 28, the threshold deviation can be based on an air data type of first air data value 26 and second air data value 28, such as an airspeed type, altitude type, angle of attack type, or other air data type. For instance, the threshold deviation can be a first threshold deviation for an altitude type of air data value, such as a threshold deviation of ten feet, twenty feet, one hundred feet, or other threshold deviations. The threshold deviation can be a second threshold deviation for an airspeed type of air data value, such as a threshold deviation of five knots, ten knots, or other threshold deviations. In general, fault isolator 24 can store (e.g., in computer-readable memory) any number of threshold deviations corresponding to any number of types of air data values, and can utilize the threshold deviations to identify deviations between first air data value 26 and second air data value 28 that are indicative of a fault condition associated with one or more of input parameters 12A-12N.

Fault isolator 24 can time-synchronize first air data value 26 and input parameters 12A-12N that are processed through synthetic artificial intelligence network 22 and diagnostic artificial intelligence networks 14 to generate second air data value 28 and diagnostic air data values 30A-30N, respectively. For example, fault isolator 24 can utilize input parameters 12A-12N that are received at a same time, or within a threshold time window as compared to a time when first air data value 26 is received (or generated). Accordingly, fault isolator 24 can help to ensure that first air data value 26, second air data value 28, and the plurality of diagnostic air data values 30A-30N are each determined based on a same or similar flight condition of the associated aircraft.

Diagnostic artificial intelligence networks 14 includes a plurality of separate artificial intelligence networks, each excluding a different one of input parameters 12A-12N and each configured (e.g., trained) to generate an air data value of a same type as each of first air data value 26 and second air data value 28 (i.e., an altitude type, a calibrated airspeed type, a true airspeed type, a Mach number type, an angle of attack type, an angle of sideslip type, or other types of air data value). Fault isolator 24, in operation, compares the set of diagnostic air data values 30A-30N to first air data value 26, and identifies one or more of diagnostic air data values 30A-30N that are in agreement with first air data value 26, as is further described below. Fault isolator 24 identifies, for those of diagnostic air data values 30A-30N that are in agreement with first air data value 26, the one of input parameters 12A-12N that was excluded from the corresponding one of diagnostic artificial intelligence networks 14 that was utilized to generate the respective diagnostic air data value. Fault isolator 24 identifies the excluded one of input parameters 12A-12N as a fault source parameter that is associated with a fault condition. Fault isolator 24 can output an indication of the one or more fault source parameters and/or data corresponding to the identified fault source parameters, such as the value of the fault source parameter, the value of the corresponding diagnostic air data value, or other data.

Accordingly, system 10 implementing synthetic air data system 16, can identify one or more input parameters that are associated with a fault condition, thereby enhancing the aircraft fault identification and isolation operations and increasing operational reliability of the aircraft in general. Moreover, techniques of this disclosure can enable synthetic air data system 16 to identify fault conditions corresponding to aircraft systems that are not traditionally related to air data systems, such as engine control systems, landing gear systems, flight control systems, or other systems not traditionally associated with the generation of air data values, thereby providing redundancy of fault detection and isolation for a varied array of aircraft systems.

Figure 2:
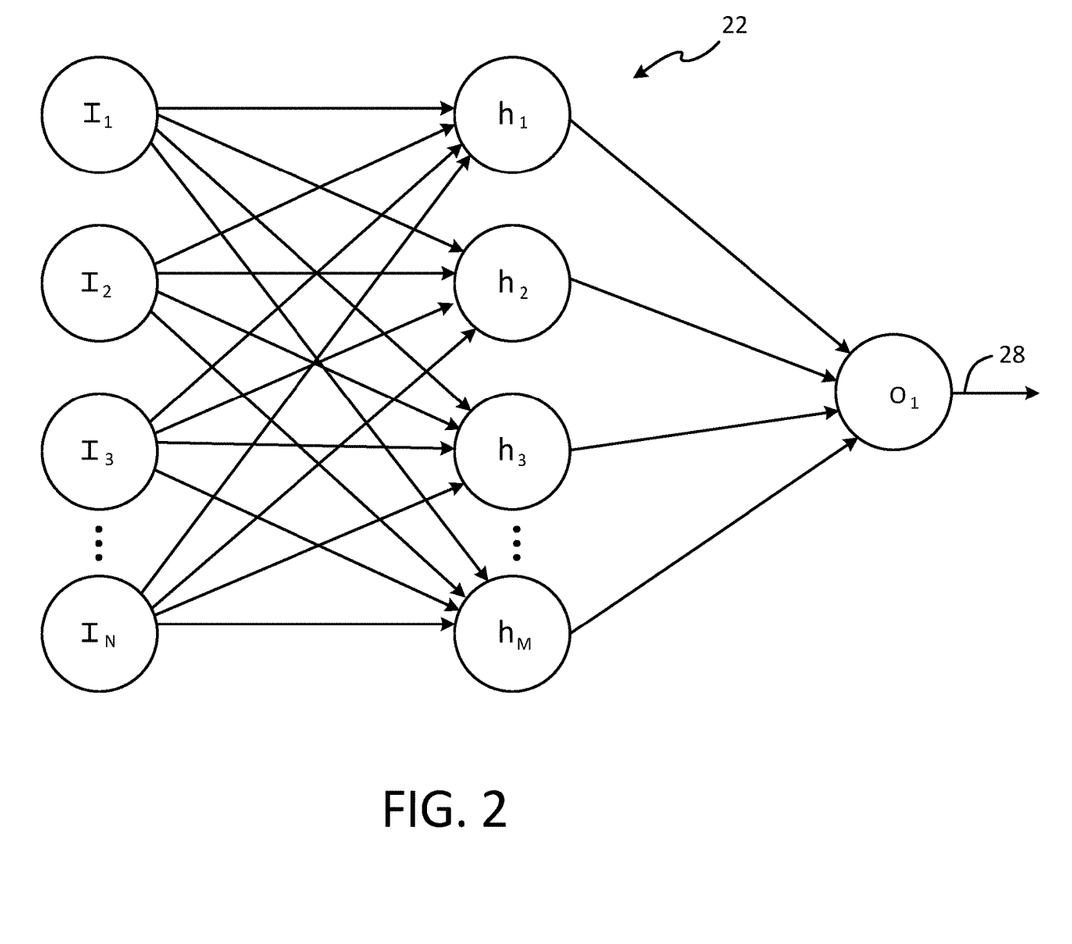
FIG. 2 is a schematic diagram of an example artificial neural network that can be used to process input parameters to generate an air data value.

FIG. 2 is a schematic diagram of one example of synthetic artificial intelligence network 22 of FIG. 1 in the form of an artificial neural network that can be used to process input parameters 12A-12N to generate second air data value 28. As illustrated in FIG. 2, artificial intelligence network 22 can be an artificial neural network including input notes $I_1$-$I_N$, internal nodes (or neurons) $h_1$-$h_M$ that are often referred to as a hidden layer, and output node $O_1$. It should be understood that in the letter "N" of input node $I_N$ and the letter "M" of internal node $h_M$ represent arbitrary numbers, such that each of inputs $I_1$-$I_N$ and internal nodes $h_1$-$h_M$ can include any number of input nodes and internal nodes, respectively. In certain examples, artificial intelligence network 22 can include a number of internal nodes $h_1$-$h_M$ that is one less than the number of input nodes $I_1$-$I_N$. That is, while the letter "N" of input node $I_N$ represents an arbitrary number, in some examples, the letter "M" of internal node $h_M$ represents a number that is one less than the arbitrary number represented by the letter "N".

Each of input nodes $I_1$-$I_N$ corresponds to a different one of the plurality of input parameters 12A-12N. Each of internal nodes $h_1$-$h_M$ applies a weight, bias, and transfer function (e.g., a sigmoid function) to each of input nodes $I_1$-$I_N$ to generate intermediate outputs provided by internal nodes $h_1$-$h_M$. In the illustrated example of FIG. 2, the intermediate outputs provided by internal nodes $h_1$-$h_M$ are provided as inputs to output node $O_1$. Output node $O_1$ applies predetermined weights, biases, and/or a transfer function to the intermediate outputs to generate second air data value 28.

While in the example of FIG. 2, artificial intelligence network 22 is illustrated and described as a feed-forward neural network including a single hidden layer of neurons $h_1$-$h_M$, in some examples, artificial intelligence network 22 can take the form of a recurrent neural network in which connections between units (e.g., input nodes $I_1$-$I_N$, internal nodes $h_1$-$h_M$, and/or output node $O_1$) form a directed cycle that enables artificial intelligence network 22 to store internal states of each of the nodes to thereby model dynamic temporal behavior. In addition, in some examples, artificial intelligence network 22 can include two or more layers of internal nodes $h_1$-$h_M$.

As described herein, artificial intelligence network 22, implemented by synthetic air data system 16, can be used to generate an air data value (e.g., second air data value 28) based on the set of input parameters 12A-12N, each assigned to a different one of input nodes $I_1$-$I_N$. The use of artificial intelligence network 22 can enable synthetic air data system 16 to correlate the set of input parameters 12A-12N to an air data value, the set input parameters 12A-12N being distinct from the set of input parameters received from sensor(s) 20 and utilized by air data computer 18 to generate first air data value 26. As such, in the event of a deviation between first air data value 26 and second air data value 28, fault isolator 24 can identify one or more of input parameters 12A-12N as a fault source parameter associated with a fault condition utilizing diagnostic artificial intelligence networks 14.

Figure 3:
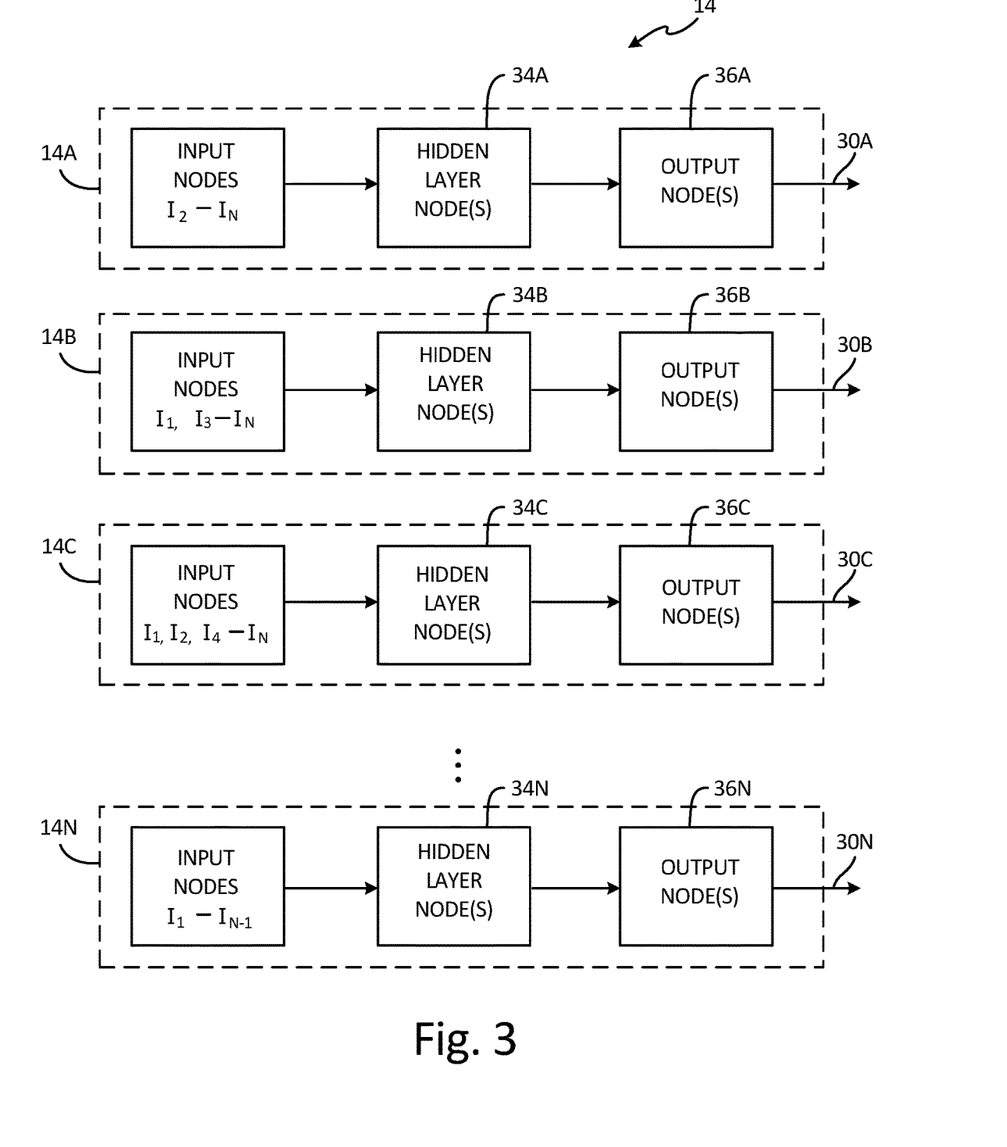
FIG. 3 is a schematic diagram of a plurality of diagnostic artificial intelligence networks that each exclude a different one of a set of input parameters to generate a set of diagnostic air data values.

FIG. 3 is a schematic diagram of diagnostic artificial intelligence networks 14 that each exclude a different one of input parameters 12A-12N to generate diagnostic air data values 30A-30N. As illustrated in FIG. 3, diagnostic artificial intelligence networks 14 can include a plurality of diagnostic artificial intelligence networks 14A-14N. Diagnostic artificial intelligence networks 14A-14N can be substantially similar to synthetic artificial intelligence network 22 (FIGS. 1 and 2), but as illustrated in FIG. 3, each of diagnostic artificial intelligence networks 14A-14N utilizes a different permutation of input nodes $I_1$-$I_N$, such that each of diagnostic artificial intelligence networks 14A-14N excludes a different one of input nodes $I_1$-$I_N$ (and hence the associated one of input parameters 12A-12N). That is, diagnostic artificial intelligence network 14A utilizes input nodes $I_2$-$I_N$, but excludes input node $I_1$. Diagnostic artificial intelligence network 14B utilizes input nodes $I_1$ and $I_3$-$I_N$, but excludes input node $I_2$. Diagnostic artificial intelligence network 14C utilizes input nodes $I_1$, $I_2$, and $I_4$-$I_N$, but excludes input node $I_3$. Each of diagnostic artificial intelligence networks 14D-14N can similarly exclude a different one of input nodes $I_4$-$I_N$, such that diagnostic artificial intelligence network 14N utilizes input nodes $I_1$-$I_{N-1}$, but excludes input node $I_N$.

Each of diagnostic artificial intelligence networks 14A-14N, in the example of FIG. 3, utilizes a different set of internal nodes 34A-34N. Each set of internal nodes 34A-34N can be configured (e.g., trained) to correlate those of input parameters 12A-12N received at the corresponding input nodes to generate intermediate outputs at internal nodes 34A-34N that are provided to output nodes 36A-36N to generate diagnostic air data values 30A-30N. That is, the set of internal nodes 34A of diagnostic artificial intelligence network 14A can be trained (e.g., via off-line pre-training using flight test data or other reference data) to apply weights, biases, and transfer functions to each of input nodes $I_2$-$I_N$ to generate intermediate outputs that are provided as inputs to output node 36A. Output node 36A applies predetermined weights, biases, and/or a transfer function to the intermediate outputs to generate diagnostic air data value 30A. Diagnostic artificial intelligence networks 14B-14N are each similarly trained to generate diagnostic air data values 30B-30N, respectively. Accordingly, fault isolator 24 of synthetic air data system 16 can identify one or more of input parameters 12A-12N as a fault source parameter that is associated with a fault condition based on a comparison of first air data value 26 and the plurality of diagnostic air data values 30A-30N, as is further described below.

Figure 4:
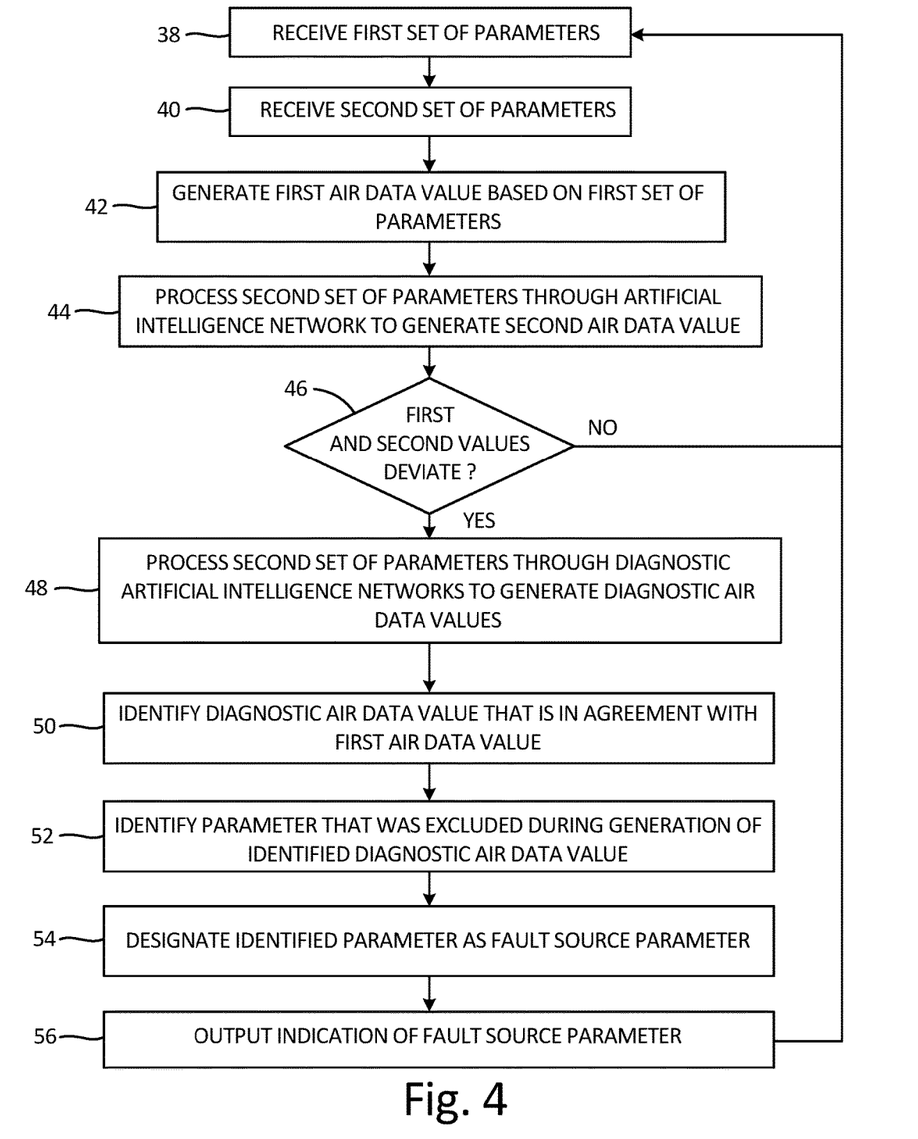
FIG. 4 is a flow diagram illustrating example operations to process a set of input parameters through a plurality of diagnostic artificial intelligence networks to identify a fault source parameter associated with a fault condition.

FIG. 4 is a flow diagram illustrating example operations to process input parameters 12A-12N through diagnostic artificial intelligence networks 14A-14N to identify one or more of input parameters 12A-12N as a fault source parameter that is associated with a fault condition. For purposes of clarity and ease of discussion, the example operations are described below within the context of system 10 of FIG. 1.

A first set of sensed parameters is received (Step 38). For example, air data computer 18 can receive a first set of parameters sensed by sensor(s) 20. A second set of parameters that does not include any of the first set of parameters is received (Step 40). For instance, synthetic air data system 16 can receive input parameters 12A-12N. The set of input parameters 12A-12N can be mutually exclusive of the first set of parameters, such that the set of input parameters 12A-12N does not include any of the first set of parameters sensed by sensor(s) 20.

A first air data value is generated based on the first set of parameters (Step 42). For example, air data computer 18 can generate first air data value 26 based on the first set of input parameters received from sensor(s) 20. The second set of parameters is processed through an artificial intelligence network to generate a second air data value (Step 44). For instance, synthetic air data system 16 can process input parameters 12A-12N through synthetic artificial intelligence network 22 to generate second air data value 28.

It is determined whether the first air data value deviates from the second air data value by a threshold amount (Step 46). For example, fault isolator 24 can determine whether first air data value 26 deviates from second air data value 28 by a threshold amount, such as a threshold amount of altitude, a threshold amount of airspeed, a threshold amount of angle of attack, or other threshold amounts. In response to determining that the first air data value does not deviate from the second air data value by the threshold amount ("NO" branch of Step 46), the first set of parameters is continued to be received. For example, in response to determining that first air data value 26 does not deviate from second air data value 28 by the threshold amount, air data computer 18 can continue to receive the first set of parameters from sensor(s) 20. In response to determining that the first air data value deviates from the second air data value by the threshold amount ("YES" branch of Step 46), processing of the second set of parameters through a plurality of diagnostic artificial intelligence networks is initiated to generate a plurality of diagnostic air data values, each of the plurality of diagnostic artificial intelligence networks excluding a different one of the second set of parameters (Step 48). For instance, in response to determining that first air data value 26 deviates from second air data value 28 by the threshold amount, fault isolator 24 can initiate processing of input parameters 12A-12N through diagnostic artificial intelligence networks 14A-14N to generate diagnostic air data values 30A-30N. In some examples, initiation of the processing of the second set of parameters through the plurality of diagnostic air data values may not be responsive to determining that the first air data value deviates from the second air data value by the threshold amount (i.e., Step 46). Rather, in such examples, the operation of Step 46 may be omitted, such that processing of the second set of parameters through the plurality of diagnostic artificial intelligence networks to generate the plurality of diagnostic air data values is performed without regard to deviation between the first air data value and the second air data value.

One or more diagnostic air data values that are in agreement with the first air data value are identified (Step 50). For example, fault isolator 24 can compare each of diagnostic air data values 30A-30N to first air data value 26. Fault isolator 24 can identify one or more of diagnostic air data values 30A-30N that are in agreement with first air data value 26, such as by identifying one or more of diagnostic air data values 30A-30N that is within a threshold deviation from first air data value 26, such as a threshold altitude deviation, a threshold airspeed deviation, a threshold Mach number deviation, a threshold angle of attack deviation, a threshold angle of sideslip deviation, or other threshold deviations.

Each of the second set of parameters that was excluded during generation of the identified diagnostic air data value(s) that is in agreement with first air data value 26 is identified (Step 52). For instance, fault isolator 24 can identify, for each of diagnostic air data values 30A-30N that is determined to be in agreement with first air data value 26, the one of input nodes $I_1$-$I_N$ that was excluded during processing of the corresponding one of diagnostic artificial intelligence networks 14A-14N to generate the identified one of diagnostic air data values 30A-30N. Fault isolator 24 can identify the one of input parameters 12A-12N that corresponds to the excluded one of input nodes $I_1$-$I_N$ as the excluded parameter.

Each of the second set of parameters that was identified as an excluded parameter is identified as a fault source parameter that is associated with a fault condition (Step 54). For example, fault isolator 24 can identify each of input parameters 12A-12N that was identified as an excluded parameter as a fault source parameter associated with a fault condition. An indication of each fault source parameter is output (Step 56), and the first set of parameters is continued to be received (Step 38). For instance, synthetic air data system 16 can output fault indication 32 including an indication of each of the identified excluded parameters.

As described herein, system 10 implementing techniques of this disclosure can compare air data values generated using mutually exclusive sets of input parameters to identify one or more of the input parameters as a fault source parameter associated with a fault condition. The techniques of this disclosure can enhance robustness of fault diagnostic operations of the aircraft generally, thereby increasing aircraft reliability.

The following are non-exclusive descriptions of possible embodiments of the present invention.

A method includes sensing a first set of parameters, and receiving a second set of parameters that does not include any of the first set of parameters. The method further includes generating a first air data value based on the first set of parameters, and processing the second set of parameters through an artificial intelligence network to generate a second air data value. The method further includes processing the second set of parameters through a plurality of diagnostic artificial intelligence networks to generate a plurality of diagnostic air data values. Each of the plurality of diagnostic artificial intelligence networks excludes a different one of the second set of parameters. The method further includes identifying, based on the first air data value and the plurality of diagnostic air data values, one of the second set of parameters as a fault source parameter that is associated with a fault condition.

The method of the preceding paragraph can optionally include, additionally and/or alternatively, any one or more of the following features, configurations, operations, and/or additional components:

The method can further include determining that the first air data value deviates from the second air data value by a threshold amount, and initiating the processing of the second set of parameters through the plurality of diagnostic artificial intelligence networks in response to determining that the first air data value deviates from the second air data value by the threshold amount.

Identifying the fault source parameter can include comparing each of the plurality of diagnostic air data values to the first air data value, identifying one of the plurality of diagnostic air data values that is in agreement with the first air data value, and identifying, as the fault source parameter, the one of the second set of parameters that was excluded during generation of the identified one of the plurality of diagnostic air data values that is in agreement with the first air data value.

Identifying the one of the plurality of diagnostic air data values that is in agreement with the first air data value can include identifying the one of the plurality of diagnostic air data values that is within a threshold deviation from the first air data value.

The method can further include outputting an indication of the fault source parameter.

Receiving the second set of parameters can include receiving one or more of an aircraft engine thrust parameter, an aircraft engine throttle setting, a flight control surface position, a flight control surface loading, an aircraft fuel usage rate, an aircraft weight, a landing gear position, an aircraft mass balance, an aircraft acceleration, and an aircraft angular rate.

Sensing the first set of parameters can include sensing one or more of a static air pressure and a total air pressure.

Each of the first air data value and the second air data value can include one of an aircraft calibrated airspeed, an aircraft true airspeed, an aircraft Mach number, an aircraft pressure altitude, an aircraft angle of attack, an aircraft vertical speed, and an aircraft angle of sideslip.

The artificial intelligence network and each of the plurality of diagnostic artificial intelligence networks can include separate artificial neural networks, each having at least one internal layer of neurons that apply one or more weights, biases, or transfer functions.

The artificial intelligence network and each of the plurality of diagnostic artificial intelligence networks can be pre-trained to determine the one or more weights, biases, or transfer functions.

A system includes one or more processors and computer-readable memory. The computer-readable memory is encoded with instructions that, when executed by the one or more processors, cause the system to generate a first air data value based on a first set of parameters, and process a second set of parameters that does not include any of the first set of parameters through an artificial intelligence network to generate a second air data value. The computer-readable memory is further encoded with instructions that, when executed by the one or more processors, cause the system to process the second set of parameters through a plurality of diagnostic artificial intelligence networks to generate a plurality of diagnostic air data values, each of the plurality of diagnostic artificial intelligence networks excluding a different one of the second set of parameters. The computer-readable memory is further encoded with instructions that, when executed by the one or more processors, cause the system to identify, based on the first air data value and the plurality of diagnostic air data values, one of the second set of parameters as a fault source parameter that is associated with a fault condition.

The system of the preceding paragraph can optionally include, additionally and/or alternatively, any one or more of the following features, configurations, operations, and/or additional components:

The computer-readable memory can be further encoded with instructions that, when executed by the one or more processors, cause the system to determine that the first air data value deviates from the second air data value by a threshold amount, and initiate the processing of the second set of parameters through the plurality of diagnostic artificial intelligence networks in response to determining that the first air data value deviates from the second air data value by the threshold amount.

The computer-readable memory can be further encoded with instructions that, when executed by the one or more processors, cause the system to identify the fault source parameter by at least causing the system to compare each of the plurality of diagnostic air data values to the first air data value, identify one of the plurality of diagnostic air data values that is in agreement with the first air data value, and identify, as the fault source parameter, the one of the second set of parameters that was excluded during generation of the identified one of the plurality of diagnostic air data values that is in agreement with the first air data value.

The computer-readable memory can be further encoded with instructions that, when executed by the one or more processors, cause the system to identify the one of the plurality of diagnostic air data values that is in agreement with the first air data value by at least causing the system to identify the one of the plurality of diagnostic values that is within a threshold deviation from the first air data value.

The computer-readable memory can be further encoded with instructions that, when executed by the one or more processors, cause the system to output an indication of the fault source parameter.

The second set of parameters can include one or more of an aircraft engine thrust parameter, an aircraft engine throttle setting, a flight control surface position, a flight control surface loading, an aircraft fuel usage rate, an aircraft weight, a landing gear position, an aircraft mass balance, an aircraft acceleration, and an aircraft angular rate.

The system can further include one or more sensors configured to sense the first set of parameters, and air data computer operatively coupled to the one or more sensors to receive the first set of parameters and generate the first air data value based on the first set of parameters.

The first set of parameters can include one of more of a static air pressure and a total air pressure.

Each of the first air data value and the second air data value can include one of an aircraft calibrated airspeed, an aircraft true airspeed, an aircraft Mach number, an aircraft pressure altitude, an aircraft angle of attack, an aircraft vertical speed, and an aircraft angle of sideslip.

The artificial intelligence network and each of the plurality of diagnostic artificial intelligence networks can include separate artificial neural networks, each having at least one internal layer of neurons that apply one or more pre-determined weights, biases, or transfer functions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   sensing a first set of parameters;
   receiving a second set of parameters that does not include any of the first set of parameters;
   generating a first air data value based on the first set of parameters;
   processing the second set of parameters through an artificial intelligence network to generate a second air data value;
   processing the second set of parameters through a plurality of diagnostic artificial intelligence networks to generate a plurality of diagnostic air data values, each of the plurality of diagnostic artificial intelligence networks excluding a different one of the second set of parameters; and
   identifying, based on the first air data value and the plurality of diagnostic air data values, one of the second set of parameters as a fault source parameter that is associated with a fault condition.

2. The method of claim 1, further comprising:
   determining that the first air data value deviates from the second air data value by a threshold amount; and
   initiating the processing of the second set of parameters through the plurality of diagnostic artificial intelligence networks in response to determining that the first air data value deviates from the second air data value by the threshold amount.

3. The method of claim 1, wherein identifying the fault source parameter comprises:
   comparing each of the plurality of diagnostic air data values to the first air data value;
   identifying one of the plurality of diagnostic air data values that is in agreement with the first air data value;
   identifying, as the fault source parameter, the one of the second set of parameters that was excluded during generation of the identified one of the plurality of diagnostic air data values that is in agreement with the first air data value.

4. The method of claim 3,
   wherein identifying the one of the plurality of diagnostic air data values that is in agreement with the first air data value comprises identifying the one of the plurality of diagnostic air data values that is within a threshold deviation from the first air data value.

5. The method of claim 1, further comprising:
   outputting an indication of the fault source parameter.

6. The method of claim 1,
   wherein receiving the second set of parameters comprises receiving one or more of an aircraft engine thrust parameter, an aircraft engine throttle setting, a flight control surface position, a flight control surface loading, an aircraft fuel usage rate, an aircraft weight, a landing gear position, an aircraft mass balance, an aircraft acceleration, an aircraft angular rate, an aircraft calibrated airspeed, an aircraft true airspeed, an aircraft Mach number, an aircraft pressure altitude, an aircraft angle of attack, an aircraft vertical speed, and an aircraft angle of sideslip.

7. The method of claim 1,
   wherein sensing the first set of parameters comprises sensing one or more of a static air pressure and a total air pressure.

8. The method of claim 1,
   wherein each of the first air data value and the second air data value comprise one of an aircraft calibrated airspeed, an aircraft true airspeed, an aircraft Mach number, an aircraft pressure altitude, an aircraft angle of attack, an aircraft vertical speed, and an aircraft angle of sideslip.

9. The method of claim 1,
   wherein the artificial intelligence network and each of the plurality of diagnostic artificial intelligence networks comprise separate artificial neural networks, each having at least one internal layer of neurons that apply one or more weights, biases, or transfer functions.

10. The method of claim 9,
    wherein the artificial intelligence network and each of the plurality of diagnostic artificial intelligence networks are pre-trained to determine the one or more weights, biases, or transfer functions.

11. A system comprising:
    one or more processors; and
    non-transitory computer-readable memory encoded with instructions that, when executed by the one or more processors, cause the system to:
      generate a first air data value based on a first set of parameters;
      process a second set of parameters that does not include any of the first set of parameters through an artificial intelligence network to generate a second air data value;
      process the second set of parameters through a plurality of diagnostic artificial intelligence networks to generate a plurality of diagnostic air data values, each of the plurality of diagnostic artificial intelligence networks excluding a different one of the second set of parameters; and
      identify, based on the first air data value and the plurality of diagnostic air data values, one of the second set of parameters as a fault source parameter that is associated with a fault condition.

12. The system of claim 11,
    wherein the computer-readable memory is further encoded with instructions that, when executed by the one or more processors, cause the system to:
      determine that the first air data value deviates from the second air data value by a threshold amount; and
      initiate the processing of the second set of parameters through the plurality of diagnostic artificial intelligence networks in response to determining that the first air data value deviates from the second air data value by the threshold amount.

13. The system of claim 11,
    wherein the computer-readable memory is further encoded with instructions that, when executed by the one or more processors, cause the system to identify the fault source parameter by at least causing the system to:
      compare each of the plurality of diagnostic air data values to the first air data value;
      identify one of the plurality of diagnostic air data values that is in agreement with the first air data value; and
      identify, as the fault source parameter, the one of the second set of parameters that was excluded during generation of the identified one of the plurality of diagnostic air data values that is in agreement with the first air data value.

14. The system of claim 13,
    wherein the computer-readable memory is further encoded with instructions that, when executed by the one or more processors, cause the system to identify the one of the plurality of diagnostic air data values that is in agreement with the first air data value by at least causing the system to:

identify the one of the plurality of diagnostic values that is within a threshold deviation from the first air data value.

15. The system of claim 11, wherein the computer-readable memory is further encoded with instructions that, when executed by the one or more processors, cause the system to output an indication of the fault source parameter.

16. The system of claim 11, wherein the second set of parameters comprises one or more of an aircraft engine thrust parameter, an aircraft engine throttle setting, a flight control surface position, a flight control surface loading, an aircraft fuel usage rate, an aircraft weight, a landing gear position, an aircraft mass balance, an aircraft acceleration, an aircraft angular rate, aircraft calibrated airspeed, an aircraft true airspeed, an aircraft Mach number, an aircraft pressure altitude, an aircraft angle of attack, an aircraft vertical speed, and an aircraft angle of sideslip.

17. The system of claim 11, further comprising:

one or more sensors configured to sense the first set of parameters; and an air data computer operatively coupled to the one or more sensors to receive the first set of parameters and generate the first air data value based on the first set of parameters.

18. The system of claim 17, wherein the first set of parameters comprises one of more of a static air pressure and a total air pressure.

19. The system of claim 11, wherein each of the first air data value and the second air data value comprise one of an aircraft calibrated airspeed, an aircraft true airspeed, an aircraft Mach number, an aircraft pressure altitude, an aircraft angle of attack, an aircraft vertical speed, and an aircraft angle of sideslip.

20. The system of claim 11, wherein the artificial intelligence network and each of the plurality of diagnostic artificial intelligence networks comprise separate artificial neural networks, each having at least one internal layer of neurons that apply one or more pre-determined weights, biases, or transfer functions.

* * * * *